United States Patent [19]
Hori et al.

[11] Patent Number: 5,601,626
[45] Date of Patent: Feb. 11, 1997

[54] SUPPORT CONSTRUCTION OF FILTER ELEMENT IN DUST COLLECTING APPARATUS

[75] Inventors: Yoshiaki Hori, Nagoya; Yasuo Akitsu, Handa, both of Japan

[73] Assignee: NGK Insulators, Ltd., Japan

[21] Appl. No.: 472,777

[22] Filed: Jun. 7, 1995

[30] Foreign Application Priority Data

Aug. 4, 1994 [JP] Japan .................................. 6-183767

[51] Int. Cl.$^6$ .............................. B01D 46/24; C04B 38/00
[52] U.S. Cl. ................................ 55/493; 55/483; 55/495; 55/502; 55/508; 55/523
[58] Field of Search ........................... 55/484, 483, 493, 55/495, 502, 504, 507, 508, 511, 523

[56] References Cited

U.S. PATENT DOCUMENTS

| | | | |
|---|---|---|---|
| 3,441,381 | 4/1969 | Keith et al. | 55/502 |
| 4,416,675 | 11/1983 | Montreith | 55/523 |
| 4,419,108 | 12/1983 | Frost et al. | 55/502 |
| 4,428,758 | 1/1984 | Montierth | 55/523 |
| 4,531,363 | 7/1985 | Ludecke et al. | 55/523 |
| 4,949,398 | 8/1990 | Thomaides et al. | 55/508 |
| 5,082,479 | 1/1992 | Miller | 55/523 |
| 5,207,807 | 5/1993 | Manfre et al. | 55/523 |

FOREIGN PATENT DOCUMENTS

| | | |
|---|---|---|
| 0657202 | 6/1995 | European Pat. Off. . |
| 4-354506 | 12/1992 | Japan . |
| 7-136438 | 5/1995 | Japan ..................................... 55/523 |

OTHER PUBLICATIONS

Patent Abstracts of Japan, vol. 17, No. 211 (c-1052), 26 Apr. 1993 & JP-A-04 354506.

*Primary Examiner*—Jay H. Woo
*Assistant Examiner*—Duane S. Smith
*Attorney, Agent, or Firm*—Parkhurst, Wendel & Burr, L.L.P.

[57] ABSTRACT

A support construction for a ceramic filter element adapted for use in a dust collecting apparatus, wherein the ceramic filter element is mounted within a tubular support housing which is formed at its inner periphery with an inward flange enclosing an outer periphery of the filter element. The filter element has one end portion formed at its outer periphery with an outward flange which is coupled with the internal wall surface of the support housing through an encircling sealing member and engaged at one side thereof with the inward flange of the support housing. A pressure plate in the form of a window frame is coupled within one end portion of the support housing and pressed to the outward flange of the filter element such that the outward flange of the filter element is clamped by the pressure plate and the inward flange of the support housing.

5 Claims, 4 Drawing Sheets

5,601,626

SUPPORT CONSTRUCTION OF FILTER ELEMENT IN DUST COLLECTING APPARATUS

BACKGROUND OF THE INVENTION

1. Field of the Invention

The present invention relates to a dust collecting apparatus adapted for use in various industrial plants such as a steel manufacturing plant, a cement plant, various kinds of chemical plants and the like for purifying high-temperature exhaust gases discharged therefrom, and more particularly to a support construction of a ceramic filter element adapted for use in the dust collecting apparatus.

2. Description of Prior Art

Disclosed in Japanese Patent Laid-open Publication No. 354506/1992 is a dust collecting apparatus of this kind which includes an upright housing provided at its upper portion with an inlet duct and at its bottom portion with a discharge duct. A ceramic filter assembly composed of a plurality of ceramic filter elements is aligned in parallel and mounted within the upright support housing to form an inlet chamber in open communication with the inlet duct and a discharge chamber in open communication with the discharge duct. Each of the filter elements is made of porous ceramic material and having a thin walled cellular structure formed with a plurality of axially extending passages separated from each other by thin partition walls, wherein a first group of axial passages are in the form of inlet passages closed at one end and open at the other end thereof to introduce exhaust gases supplied from the inlet chamber to be purified, while a second group of axial passages are in the form of outlet passages open at one end thereof to discharge purified gases therefrom into the discharge chamber and closed at the other end thereof. In the dust collecting apparatus, exhaust gases to be purified are introduced into the first group of axial inlet passages at an upstream side of the filter assembly so that the thin partition walls of the filter elements act to collect dust from the exhaust gases permeating therethrough from the first group of the axial inlet passages into the second group of axial outlet passages thereby to purify the exhaust gases.

In the dust collecting apparatus, each of the ceramic filter elements is enclosed by a sealing member and fixed in place within the upright housing through the sealing member to prevent leakage of exhaust gases passing therethrough. In such a support construction of the filter elements, however, the filling condition of the sealing member depends on the worker's skill. Accordingly, when exhaust gases under high pressure are supplied into the inlet chamber of the dust collecting apparatus, the sealing members tend to be moved toward a downstream side of the filter assembly by a difference in pressure between the inlet and discharge chambers. This causes undesired influence on the sealed condition of the filter elements. During a reverse washing process of the filter elements, the sealing members tend to be moved toward the upstream side of the filter assembly by the pressure of washing gas supplied into the downstream side of the filter elements.

SUMMARY OF THE INVENTION

It is, therefore, a primary object of the present invention to provide an improved support construction for the ceramic filter element in a dust collecting apparatus, which is capable of overcoming the problems discussed above.

According to the present invention, the object is attained by providing a support construction of a ceramic filter element adapted for use in a dust collecting apparatus, the filter element being made of porous ceramic material and having a thin walled cellular structure formed with a plurality of axially extending passages separated from each other by thin partition walls, a first group of the axial passages being in the form of inlet passages closed at one end and open at the other end thereof to introduce therein exhaust gases to be purified, while a second group of the axial passages being in the form of outlet passages open at one end thereof to discharge purified gases therefrom and closed at the other end thereof. The ceramic filter element is mounted within a tubular support housing which is formed at its inner periphery with an inward flange enclosing an outer periphery of the filter element. The filter element has one end portion formed at its outer periphery with an outward flange which is coupled with an internal wall surface of the support housing through an encircling sealing member and engaged at one side thereof with the inward flange of the support housing. A pressure plate in the form of a window frame is coupled within one end portion of the support housing and pressed to the outward flange of the filter element such that the outward flange of the filter element is clamped by the pressure plate and the inward flange of the support housing.

In a practical embodiment of the present invention, it is preferable that a sheet-like encircling sealing member is disposed respectively between the outward flange of the filter element and the inward flange of the support housing and between the outward flange of the filter element and the pressure plate.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
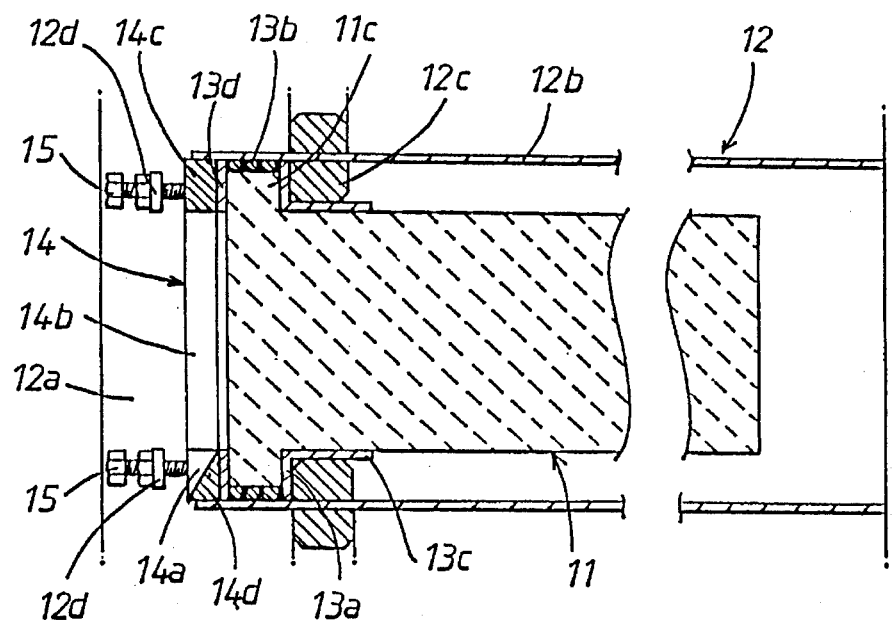
FIG. 1 is a sectional view of a ceramic filter element supported by a support construction in accordance with the present invention.
Figure 3:
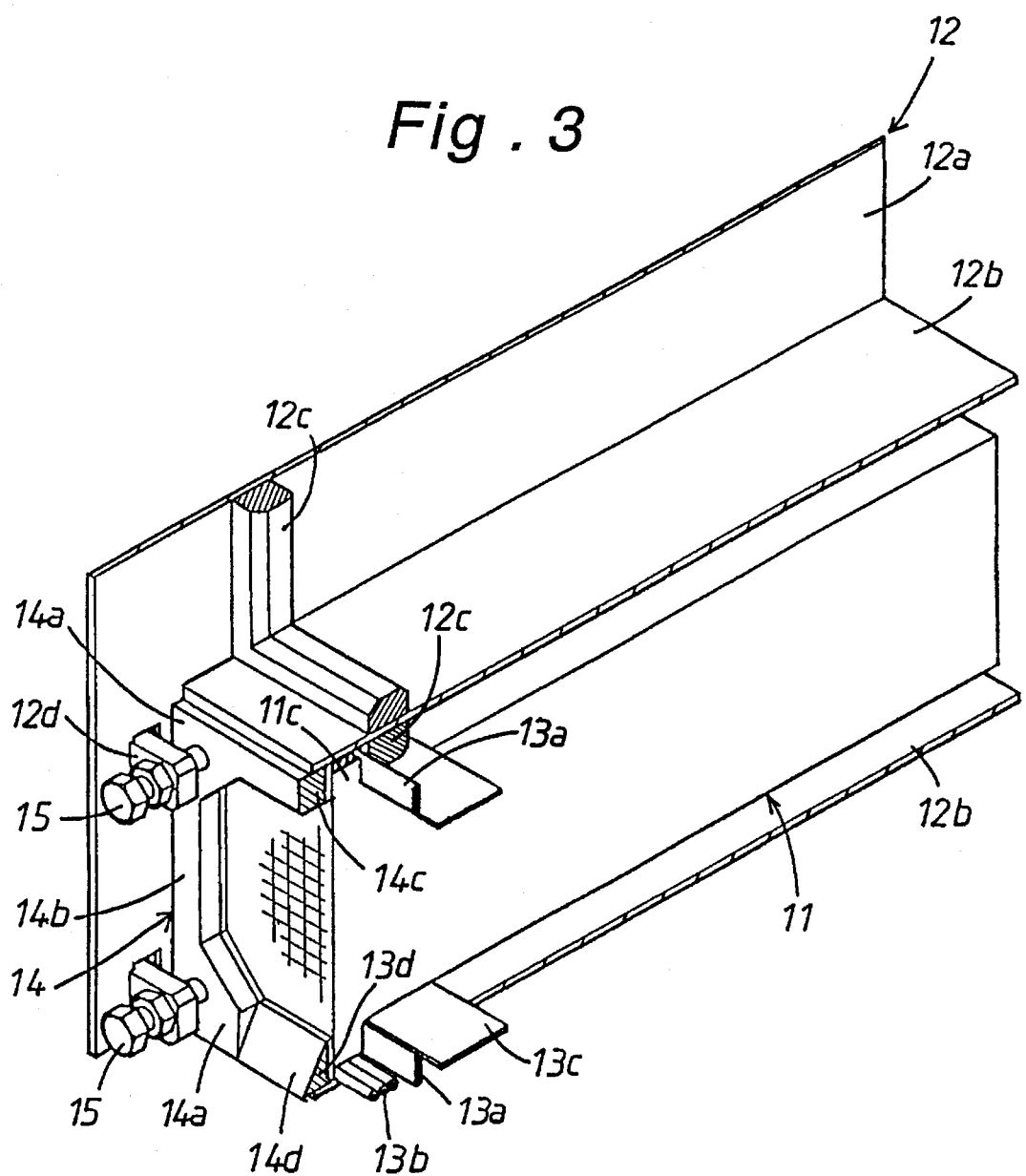
FIG. 3 is a partly broken perspective view of the support construction shown in FIG. 1.
Figure 4:
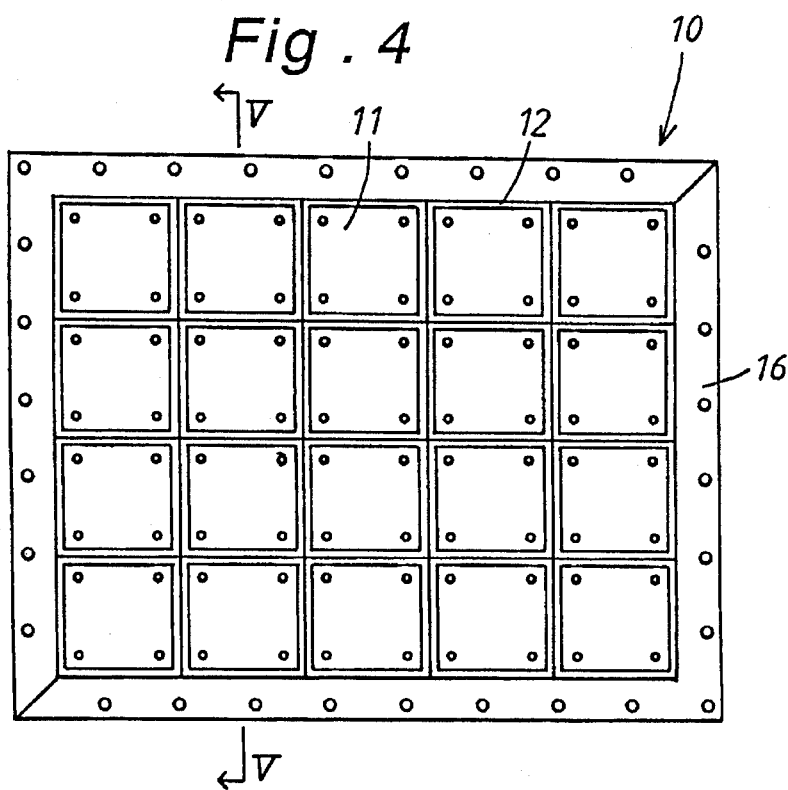
FIG. 4 is a front view of a ceramic filter assembly unit composed of a plurality of ceramic filter elements.
Figure 5:
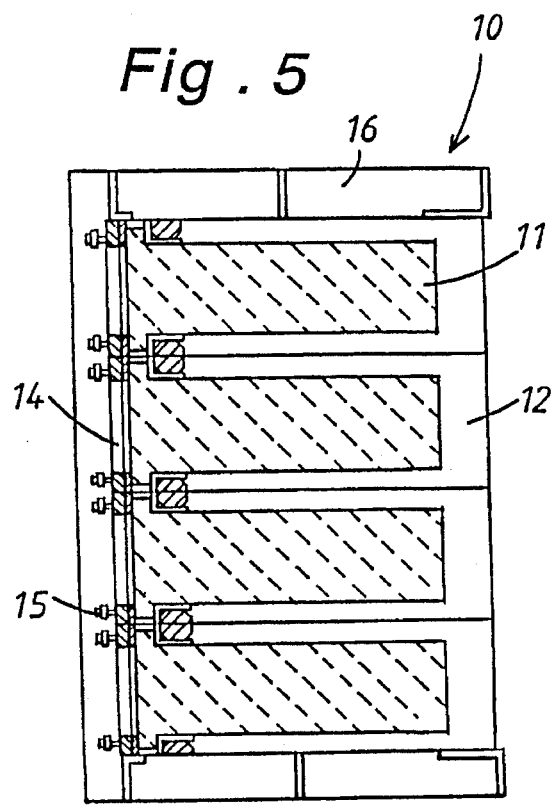
FIG. 5 is a vertical sectional view of the ceramic filter assembly taken along line V—V in FIG. 4.

In FIGS. 1 and 3 of the drawings, there is illustrated a ceramic filter element 11 supported by a support construction in accordance with the present invention. As shown in FIGS. 4 and 5, the filter element 11 is vertically piled up at plural steps and laterally arranged in plural rows. Thus, a ceramic filter assembly unit 10 is composed of the plurality of filter element 11.

Figure 6:
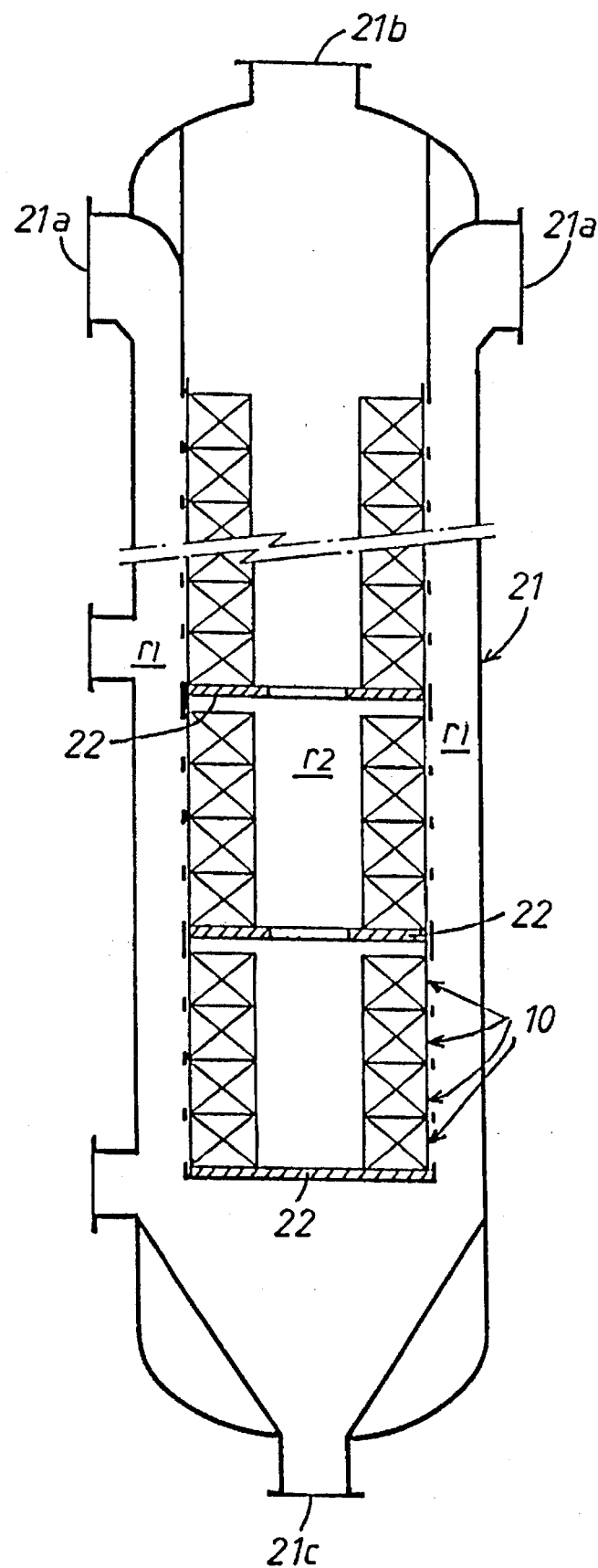
FIG. 6 is a vertical sectional view of a dust collecting apparatus.

Illustrated in FIG. 6 is a dust collecting apparatus which includes an upright cylindrical housing 21 provided therein with a plurality of circumferentially placed lateral support beams 22 arranged at vertically equally spaced plural steps to form a plurality of circumferentially spaced vertical gas induction passages r1 along an internal peripheral surface of the housing 21 and a vertical discharge passage r2 at the center of the housing 21. In the dust collecting apparatus, plural sets of the ceramic filter assembly units 10 are circumferentially arranged and vertically mounted on each of the support beams 22 in such a manner that the filter assembly units 10 are exposed at their outer ends to the gas induction passages r1 and at their inner ends to the discharge passage r2. The cylindrical upright housing 21 is provided with inlet ducts 21a at its upper side walls and a discharge duct 21b at its upper end. A pyramidal hopper 21c is integrally assembled with a bottom portion of housing 21 to permit dust falling therethrough into a container chamber (not shown).

Figure 2:
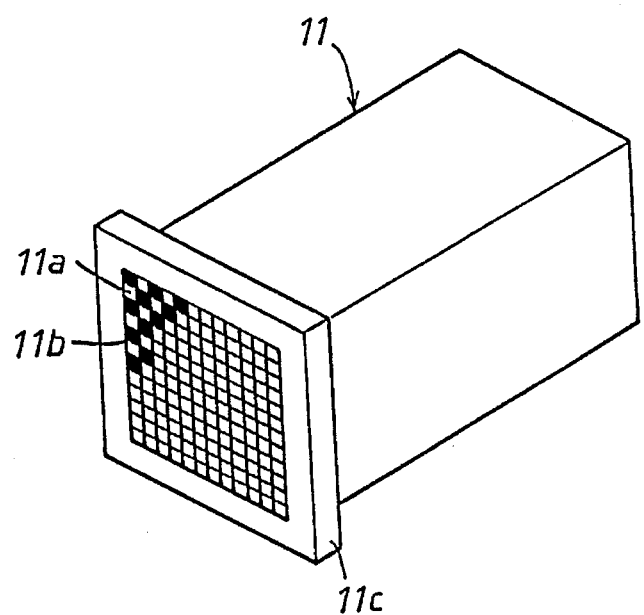
FIG. 2 is a perspective view of the ceramic filter element shown in FIG. 1.

The ceramic filter elements 11 of the respective filter assembly units 10 each are supported by a tubular support housing 12 of square cross-section as shown in FIG. 3 and clamped by a pair of flanged side shell members 16 each formed in a L-letter shape in cross-section. As shown in FIG. 2, the filter elements 11 each are made of porous ceramic material and have a thin-walled cellular or honey-comb structure of square cross-section formed with a plurality of axially extending passages separated from each other by thin partition walls. A first group of the axial passages are in the form of inlet passages 11a closed at their one ends in a checked pattern and open at their other ends to introduce therein exhaust gases to be purified. A second group of the axial passages are in the form of outlet passages 11b open at their one ends to discharge purified gases therefrom and closed at their other ends in a checked pattern.

The ceramic filter element 11 mounted within the support housing 12 has one end portion integrally formed at its outer periphery with an outward flange 11c which is coupled with the internal wall surface of the support housing 12. As shown in FIG. 3, the support housing 12 is composed of a pair of vertical side wall members 12a laterally spaced in parallel to one another and a pair of horizontal wall members 12b vertically spaced in parallel to one another. As shown in FIGS. 1 and 3, the support housing 12 is provided at its inner periphery with an inward flange 12c which is inwardly projected and coupled over the outer periphery of the filter element 11. The inward flange 12c of support housing 12 is engaged at one side thereof with the outward flange 11c of filter element 11 through a sheet-like sealing member 13a formed in a square frame. Disposed between the outward flange 11c of filter element 11 and the internal wall surface of the support housing 12 is a plurality of encircling sealing members 13b of circular in cross-section. Additionally, a sheet-like encircling sealing member 13c is disposed between the inward flange 12c of support housing 12 and the corresponding outer surface of filter element 11. A pressure plate 14 in the form of a window frame is engaged with the outward flange 11c of filter element 11 through a sheet-like encircling sealing member 13d and is pressed to the filter element 11 by fastening bolts 15 to clamp the outward flange 11c of filter element 11 with the inward flange 12c of support housing 12.

As shown in FIG. 3, the pressure plate 14 has four corner portions 14a, a pair of vertical portions 14b and an upper horizontal portion 14c which are formed with front flat surfaces and a lower horizontal portion 14d formed with downwardly inclined front surface. The outer dimension of pressure plate 14 is slightly smaller that the inner dimension of the support housing 12. The fastening bolts 15 are threaded into horizontal support brackets 12d which are secured to the vertical wall member 12a of support housing 12. Thus, the fastening bolts 15 are forwarded to press the pressure plate 14 toward the outward flange 11c of filter element 11 or retracted to release the pressure plate 14 from the outward flange 11c of filter element 11.

In the dust collecting apparatus as described above, exhaust gases under pressure to be purified are introduced into the ceramic filter assembly units 10 from the inlet ducts 21a through the gas induction passages r1 and purified by the filter elements in the ceramic filter assembly units 10. The purified gases are introduced into the discharge passage r2 and discharged outwardly therefrom through the discharge duct 21b. During such treatment of the exhaust gases are collected at the partition walls of the filter elements and accumulated on the surfaces of the partition walls. In a reverse washing process of the dust collecting apparatus, washing gas under high pressure is supplied into the discharge passage r2 through the discharge duct 21b. In this instance, the washing gas is introduced into the outlet passages of the filter elements in the respective filter assembly units 10 to flow into the inlet passages of the filter elements through the partition walls. This increases a difference in pressure between the outlet and inlet passages of the filter elements. Thus, the accumulated fine particles of dust are separated from the partition walls of the filter elements and fall into the container chamber (not shown) from the hopper 21c.

In each support construction of the filter elements in the respective filter assembly units 10, the outward flange 11c of the filter element 11 is clamped by the inward flange 12c of support frame 12 and the pressure plate 14 through the sheet-like encircling sealing members 13a and 13d, while the encircling sealing members 13b are placed between the outer periphery of the outward flange 11c and the internal wall surface of the support housing 12. Thus, the encircling sealing members 13b are retained in place without any movement even when applied with the pressure of the exhaust gases or the washing gas. Since the filter element 11 is engaged with the support housing 12 only at its outward flange 11c, any longitudinal bending stress does not occur in the filter element 11 in spite of thermal deformation of the support housing 12. Thus, the filter element 11 is retained in a stable condition for a long period of time without causing any damage at its outward flange 11c.

Although in the foregoing support construction, a portion of dust is accumulated on the pressure plate 14 during treatment of the exhaust gases, the inclined surface of the lower horizontal portion 14d of pressure plate 14 causes the accumulated dust to slide down thereby to prevent accumulation of the dust.

What is claimed is:

1. A support construction for a ceramic filter element adapted for use in a dust collecting apparatus, said filter element comprising porous ceramic material and having a thin walled cellular structure formed with a plurality of axially extending passages separated from each other by thin partition walls, a first group of the axial passages being in the form of inlet passages each closed at one end thereof and open at the other end thereof to introduce therein exhaust gases to be purified, while a second group of the axial passages being in the form of outlet passages each open at one end thereof to discharge purified gases therefrom and closed at the other end thereof, wherein said ceramic filter element is mounted within a
tubular support housing having an inward flange formed at the inner periphery thereof, said tubular support housing enclosing an outer periphery of said filter element, said filter element having one end portion formed at the outer periphery thereof with an outward flange which is coupled with an internal wall surface of said support housing through an encircling sealing means and engaged at one side thereof with the inward flange of said support housing, and wherein a pressure plate in the form of a window frame is coupled within one end portion of said support housing and pressed against the outward flange of said filter element at the other side thereof such that the outward flange of said filter element is clamped by said pressure plate and the inward flange of said support housing.

2. A support construction of a ceramic filter element as recited in claim 1, wherein a sealing member is disposed respectively between the outward flange of said filter element and the inward flange of said support housing and between said pressure plate and the outward flange of said filter element.

3. A support construction of a ceramic filter element as recited in claim 1, wherein said pressure plate is pressed against the outward flange of said filter element by means of plurality of fastening bolts which are threaded into a plurality of support brackets secured to the one end portion of said support housing.

4. A support construction of a ceramic filter element as recited in claim 1, wherein said encircling sealing means disposed between the outward flange of said filter element and the internal wall surface of said support housing comprises a plurality of encircling sealing members of circular cross-section.

5. A filter apparatus, comprising:

a porous ceramic filter element having an inlet end, an opposed outlet end, and a flange extending radially outwardly from an outer periphery of said filter element proximate one of said inlet and outlet ends thereof, said flange having a first side surface, a second side surface opposed to said first side surface, and an outer peripheral surface extending between said first and second side surfaces;

a hollow support housing within which said filter element is mounted, said housing having a flange extending radially inwardly from an inner peripheral surface thereof for engagement with said first side surface of the flange of said filter element;

sealing means interposed between said outer peripheral surface of the flange of said filter element and the inner peripheral surface of said housing; and an annular pressure plate coupled to the inner peripheral surface of said housing for engagement with said second side surface of the flange of said filter element, such that the flange of said filter element is clamped between said pressure plate and the flange of said housing.

* * * * *